US012714010B2

(12) United States Patent
Eby

(10) Patent No.: US 12,714,010 B2
(45) Date of Patent: Aug. 25, 2026

(54) SYSTEM AND METHOD FOR OPERATING A MOWING IMPLEMENT HAVING SENSORS THAT TRACK A MOWING OPERATION

(71) Applicant: CNH Industrial America LLC, New Holland, PA (US)

(72) Inventor: Philip Eby, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 659 days.

(21) Appl. No.: 18/078,686

(22) Filed: Dec. 9, 2022

(65) Prior Publication Data

US 2024/0188483 A1 Jun. 13, 2024

(51) Int. Cl.
*A01D 34/00* (2006.01)
*A01D 34/64* (2006.01)
*A01D 101/00* (2006.01)

(52) U.S. Cl.
CPC ........... *A01D 34/006* (2013.01); *A01D 34/64* (2013.01); *A01D 2101/00* (2013.01)

(58) Field of Classification Search
CPC ... A01D 34/006; A01D 34/64; A01D 2101/00
See application file for complete search history.

(56) References Cited

U.S. PATENT DOCUMENTS

| | | | |
|---|---|---|---|
| 6,804,597 | B1 | 10/2004 | Posselius et al. |
| 7,089,721 | B2 | 8/2006 | Turner et al. |
| 9,265,196 | B2 | 2/2016 | Albinger et al. |
| 9,393,997 | B2 | 7/2016 | Schlichting |
| 10,595,459 | B2 | 3/2020 | Aposhian et al. |
| 10,795,351 | B2 | 10/2020 | Hurd |
| 10,980,173 | B2 | 4/2021 | Becke et al. |
| 2006/0191250 | A1 | 8/2006 | Neuberburg et al. |
| 2018/0325015 | A1 | 11/2018 | Wolters et al. |
| 2021/0127551 | A1 | 5/2021 | Priepke et al. |
| 2021/0185928 | A1 | 6/2021 | Fillep et al. |

FOREIGN PATENT DOCUMENTS

| | | |
|---|---|---|
| DE | 10335112 A1 | 2/2005 |
| DE | 10217398 B4 | 6/2007 |

OTHER PUBLICATIONS

Extended European Search Report for EP Application No. 23215690.1 dated May 24, 2024 (seven pages).

*Primary Examiner* — Claude J Brown
(74) *Attorney, Agent, or Firm* — Dority & Manning, P.A.

(57) ABSTRACT

A side mowing system includes a side mower structured for towing by a work vehicle and configured to mow a section of ground laterally offset from the work vehicle as it traverses the ground. The side mower includes a mowing deck having a mowing mechanism coupled to the mowing deck useful for cutting vegetation. A mower-to-vehicle coupler is also provided and is configured for coupling the side mower to the work vehicle and structured to carry a towing load imparted to the side mower as a result of being towed behind the work vehicle. At least one side mowing sensor is configured to generate at least one side mower signal related to at least one side mower parameter. A data hub is in data communication with the at least one side mowing sensor, the data hub structured to transmit usage data associated with the at least one side mower parameter.

19 Claims, 5 Drawing Sheets

SYSTEM AND METHOD FOR OPERATING A MOWING IMPLEMENT HAVING SENSORS THAT TRACK A MOWING OPERATION

FIELD OF THE INVENTION

The present disclosure generally relates to mowing implements and, more particularly, to systems and methods for operation of side mowing implements.

BACKGROUND OF THE INVENTION

It is well known that some agricultural operations, such as mowing field grass and hay, make use of mowing implements that are towed behind work vehicles. A number of different configurations exist to position and support the mowing implement behind the work vehicle, including through the use of tow bars and other types of implement-to-vehicle couplers.

In some applications, operators wish to position the mowing implement to the side of the work vehicle so that passage of the vehicle does not crush or otherwise push over vegetation, such as hay, before the mowing implement can cut the hay. Such mowers that are configured to be towed to the side of the work vehicle can be referred to as side mowers. Side mowers, and mowing implements in general, can in some instances be rudimentary, and are in many instances operated without continuous monitoring of its mowing operations.

Accordingly, an improved system and method for tracking a mowing operation would be welcomed in the technology.

SUMMARY OF THE INVENTION

Aspects and advantages of the technology will be set forth in part in the following description, or may be obvious from the description, or may be learned through practice of the technology.

In some aspects, the present subject matter is directed to a side mowing system includes a side mower structured for towing by a work vehicle and configured to mow a section of ground laterally offset from the work vehicle as the work vehicle traverses the ground. The side mower includes a mowing deck having a mowing mechanism coupled to the mowing deck, the mowing mechanism having a moveable mowing blade structured to move relative to the mowing deck for cutting vegetation. The side mowing system further includes a mower-to-vehicle coupler configured for coupling the side mower to the work vehicle and structured to carry a towing load imparted to the side mower as a result of being towed behind the work vehicle. The system also includes at least one side mowing sensor configured to generate at least one side mower signal related to at least one side mower parameter. The system further includes a data hub in data communication with the at least one side mowing sensor, the data hub structured to transmit usage data associated with the at least one side mower parameter.

In some aspects, the present subject matter is directed to a method of operating a side mower system. The method includes delivering mechanical power from a work vehicle to a side mower, the side mower having a mowing deck laterally offset from the work vehicle through a mower-to-vehicle coupler for mowing a section of ground laterally offset from the work vehicle. The method also includes communicating at least one side mower signal from at least one side mowing sensor to a data hub affixed to the side mower. The method also includes communicating at least one data hub signal including information based on the at least one side mower signal from the data hub to an external device.

In some aspects, the present subject matter is directed to a towed mower having a mowing deck having a moveable mowing blade supported by the mowing deck and structured to cut vegetation. The towed mower also includes a mower-to-vehicle coupler used to couple the mowing deck to a work vehicle and structured to carry a towing load imparted to the mowing deck as a result of being towed behind the work vehicle. The towed mower also includes an implement sensor structured to generate a mowing signal related to at least one mowing parameter. A data hub is also affixed on the towed mower and in data communication with the implement sensor, the data hub structured to collect the mowing signal to create an operating data history of the towed mower.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
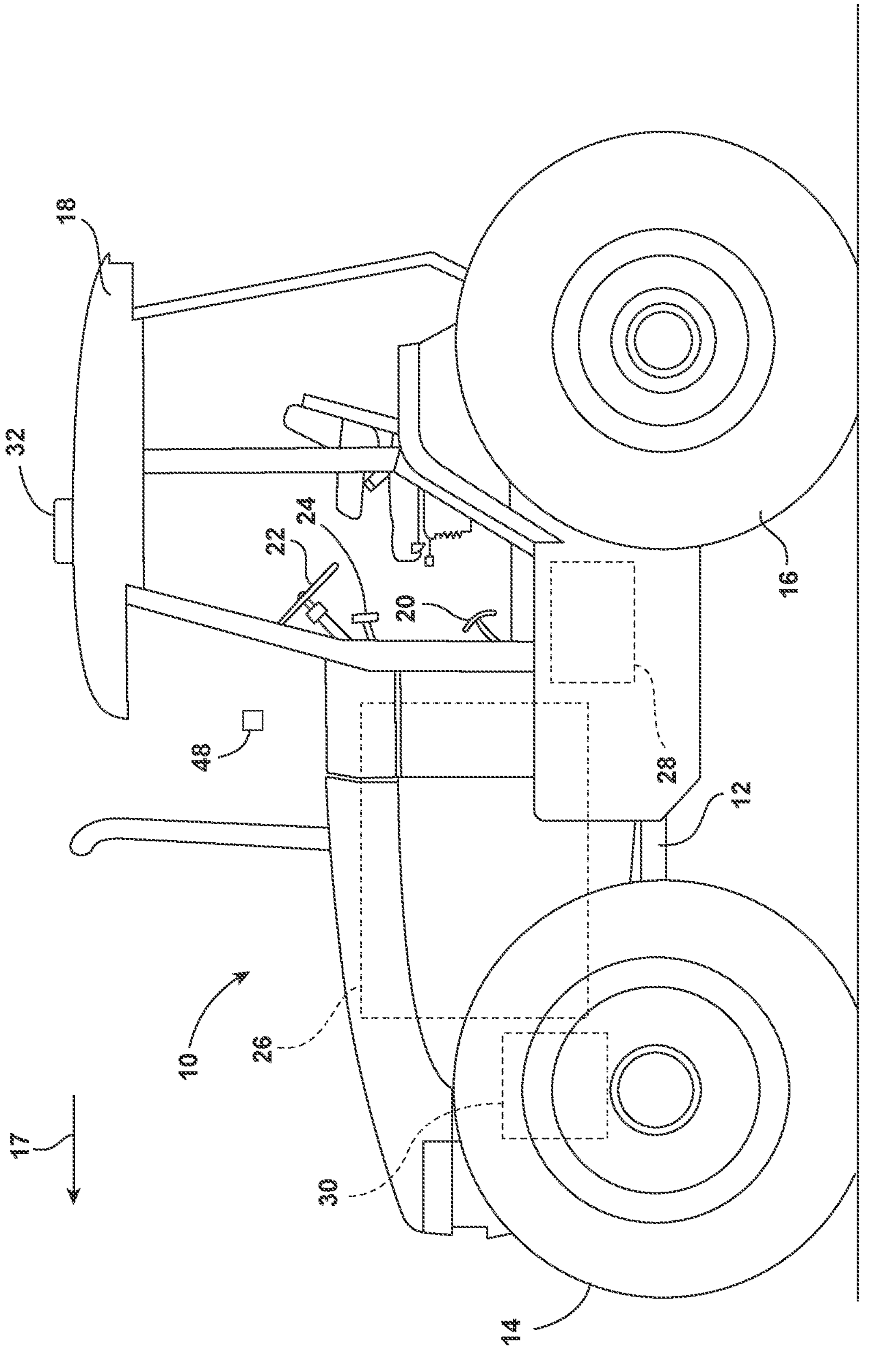
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for operating a mowing implement behind a work vehicle, which in some forms the mowing implement is a side mower. The mowing implement can include a mowing deck that supports a mowing mechanism useful to cut vegetation, such as grasses, hay, etc. The mowing implement can be connected to the work vehicle through a mower-to-vehicle coupler. In several embodiments, the mowing implement can include at least one sensor structured to detect one or more aspects of the operation of the side mower and generate a signal having content related to the mowing operation. Data can be communicated from the at least one sensor to a data hub for processing and/or archiving and/or transmitting onward to a separate device. The data hub, for its part, can be in communication with a device, such as a handheld device, that includes position information or that has access to position information provided through other channels. The position information can be paired with the content related to the mowing operation generated from the at least one sensor to create a dataset history which permits tracking of the mowing implement and coverage determination. The dataset can be transmitted onward from the data hub to a cloud computing storage for storage or further evaluation.

Referring now to the drawings, FIG. 1 illustrate a view of one embodiment of a work vehicle 10 in accordance with aspects of the present subject matter. Specifically. FIG. 1 illustrates a side view of the work vehicle 10 in which the work vehicle 10 is configured as an agricultural tractor. However, in other embodiments, the work vehicle 10 may be configured as any other suitable work vehicle known in the art, including those for agricultural and construction applications, transport, sport, and/or the like.

The work vehicle 10 may include a frame or chassis 12 configured to support or couple to a plurality of components. The frame or chassis 12 can be coupled with front and rear axles used to support a pair of traction devices coupled thereto for engaging the ground. In the illustrated embodiment, the traction devices correspond to wheels, namely a pair of steerable front wheels 14 and a pair of driven rear wheels 16. In an alternative embodiment, the front wheels 14 may be driven in addition to the rear wheels 16. Regardless, the wheels 14, 16 may be configured to support the work vehicle 10 relative to the ground to allow the vehicle 10 to be moved in a direction of travel (e.g., as indicated by arrow 17) across a field.

It should be appreciated that, as used herein, the term “wheel” is used broadly and is intended to cover various embodiments of rolling support devices, including a wheel with or without a tire provided in associated therewith. For example, in several embodiments, the term “wheel” may correspond to a wheel configured to directly contact or engage the driving surface around its outer perimeter or the term “wheel” may correspond to a wheel configured to contact or engage the driving surface via a tire or suitable inflatable member installed around its outer perimeter. It should also be appreciated that, in other embodiments, the traction devices may correspond to track assemblies or any other suitable traction devices.

Additionally, an operator’s cab 18 may be supported by a portion of the chassis 12 and may house various control or input devices 20, 22 (e.g., levers, pedals, control panels, buttons and/or the like) for permitting an operator to control the operation of the work vehicle 10. For instance, as shown in FIG. 1, the work vehicle 10 may include an actuatable pedal 20, such as a brake pedal 20 for manually actuating the vehicle’s brakes, and a steering wheel 22 for permitting an operator to manually steer the work vehicle 10. In addition, the work vehicle 10 may include a control panel 24 within the cab 18 for displaying message windows and/or alerts to the operator and/or for allowing the operator to interface with the vehicle’s controller. For instance, in one embodiment, the control panel 24 may include buttons, knobs and/or any other suitable input devices that allow the operator to provide user inputs to the controller, such as by allowing the operator to provide an input instructing the controller to operate the work vehicle 10 in an auto-guidance mode in which the controller automatically guides the work vehicle across the field along a predetermined path (including the automatic execution of turns or turning operations along such path).

Moreover, as shown, the work vehicle 10 may include an engine 26 and a transmission 28 configured to be mounted on the chassis 12 of the work vehicle 10. The transmission 28 may be operably coupled to the engine 26 via one or more shafts and may be configured to provide variably adjusted gear ratios for transferring engine power to the driven wheels 16 via the rear axle. In several embodiments, the work vehicle 10 may also include a steering assembly 30 for adjusting the direction of travel 17 of the work vehicle 10.

In some embodiments, a position device(s) 32 may also be installed on or within the work vehicle 10. In one embodiment, the position device(s) 32 may be configured to determine the exact location of the work vehicle 10 using a satellite navigation position system, such as any suitable Global Navigation Satellite System (GNSS) including, but not limited to, the GPS system, the Galileo positioning system, the Global Navigation satellite system (GLONASS), the BeiDou Satellite Navigation and Positioning system, and/or the like. For instance, the position device(s) 32 may be configured to continuously detect successive locations of the work vehicle 10 within the field. As a result, the data from the position device(s) 32 may be used to monitor not only the relative position of the work vehicle 10 within the field, but also various other movement-related parameters of the work vehicle 10, such as the ground speed and the steering rate of the work vehicle 10.

In some embodiments, the location of the work vehicle 10 alternatively and/or additionally can be determined using a handheld device 48 that is carried along by the operator or other passenger during movement of the work vehicle 10. For example, a handheld GNSS receiver can be used to collect location data of the work vehicle 10. Such a handheld GNSS receiver can be a purpose-built handheld receiver having a sole function of collecting GNSS signals and calculating location. In other forms, the handheld receiver can be part of a larger handheld device 48 that also includes the GNSS receiver. Some smart phones have such capability. In still other forms, a handheld device 48 can use cell phone tracking to estimate location which can be separate from a GNSS receiver in some embodiments, while in others it can be used in conjunction with a GNSS receiver. Although the device 48 is described as being handheld, in other embodiments the device 48 can be a device that is integrated into the work vehicle 10 and not otherwise handheld. Reference herein to “handheld device” or “computing device” will be understood to encompass both types of computing devices whether handheld or not.

In those embodiments in which the handheld device 48 includes the position device(s) 32, several variations are contemplated. For example, in those embodiments in which the handheld device 48 uses cell phone tracking, it will be appreciated that the position device(s) 32 can be a relevant transceiver capable of sampling and/or emitting a radiofrequency emission useful to permit the handheld and/or cell service to fix a location (e.g., through use of interpolating signals between adjacent towers. GSM localization, etc.). In this manner, the position of the handheld device using a position device 32 can be self-contained within the handheld and/or can rely upon cell phone networks working in conjunction with the handheld device. As suggested above, the handheld device 48 can alternatively and/or additionally include a GNSS receiver as the position device 32.

Figure 2:
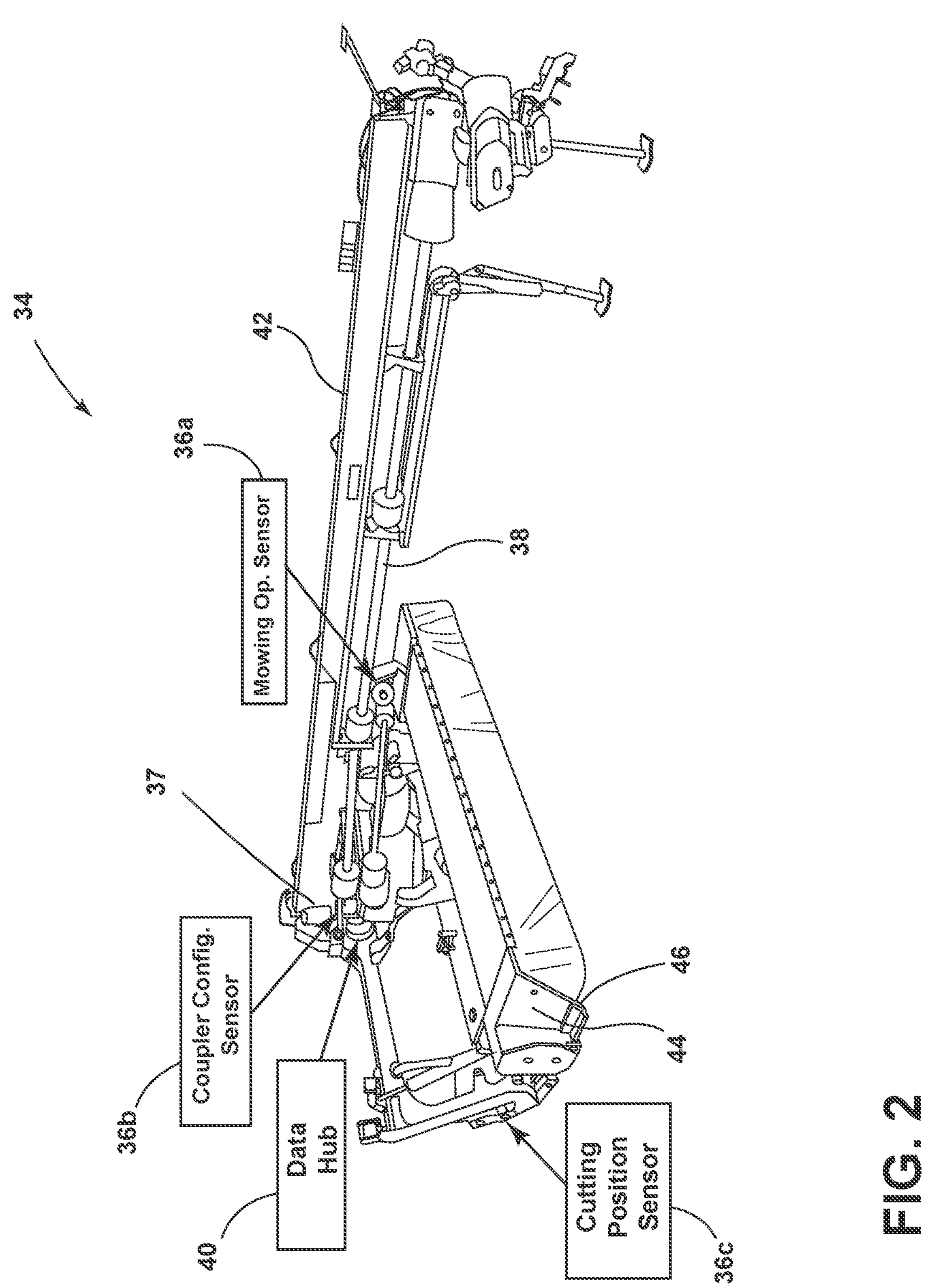
FIG. 2 illustrates a perspective view of a mowing implement in accordance with aspects of the present subject matter.

FIG. 2 illustrates a mowing implement 34 structured to be towed by the work vehicle 10 and from which a mowing operation can be conducted, such as those operations useful to cut grass or other type of productive agricultural product including, but not limited to, hay. Although the mowing implement 34 is depicted as a side mower in the illustrated embodiment, it will be appreciated that other embodiments can use other mowing implements whether or not of the side mower configuration.

The mowing implement 34 includes a mower-to-vehicle coupler 42 structured to attach the mowing implement 34 to the work vehicle 10 and a mowing deck 44 having a cutting element 46 useful to cut grass, hay, etc. The mower-to-vehicle coupler 42 in the illustrated embodiment displaces the mowing deck 44 behind the work vehicle 10 and carries the towing and mowing loads imparted as a result of towing and operating the mowing implement 34. Though the mower-to-vehicle coupler 42 is depicted in the illustrated embodiment as being a single, elongate rigid beam, other configurations of the mower-to-vehicle coupler 42 are contemplated. The cutting element 46 can take on any form useful to cut grass, hay, etc. and can be configured in proximity to the ground at a height that discourages contact with the ground but low enough that a cutting operation maximizes the length of grass/hay/etc. that is harvested. In one form, the cutting element 46 is a disc cutter.

The mowing implement 34 includes a number of sensors 36 useful to sense and generate a mowing signal having content of at least one mowing data parameter indicative of an operation of the mowing implement 34, where the sensors 36 are in data communication with a data hub 40. Although three sensors 36*a*, 36*b*, and 36*c* are depicted in the illustrated embodiment, fewer or more sensors 36 can be used in other embodiments. Thus, the mowing implement according to various embodiments includes at least one sensor 36. As will be appreciated, use of the numeric identifier 36 without an alphabetic suffix will be understood to refer to any one or more of the sensors 36*a*, 36*b*, and 36*c*.

The mowing implement 34 depicted in the embodiment of FIG. 1 includes a power take-off shaft sensor (PTO) sensor 36*a* The PTO sensor 36*a* is used to sense an operation of a PTO shaft 38 interconnected with and driven by a power take-off of the work vehicle 10. Sensing operation of the PTO shaft 38 can be indicative of a mowing operation. Thus, the PTO sensor 36*a* can also be referred to as a mowing operation sensor. The PTO shaft 38 can be selectively powered by an operator of the work vehicle 10 to provide mechanical work to drive a cutting element of the mowing implement 34 (described further below). The PTO sensor 36*a* can take a variety of forms which can be used to indicate operation of the PTO shaft 38 and/or the level of operation of the PTO shaft 38. As such, the PTO sensor 36*a* can operate to generate a signal, for example, having a Boolean characteristic (e.g., 0 indicating no operation; 1 indicating operation) or a time varying signal reflective of the speed of rotation of the PTO shaft 38. The signal output from the PTO sensor 36*a* can be a digital signal or an analog signal. In short, the sensor 36*a* can output a variety of data in a variety of forms reflective of operation of the PTO shaft 38 used to drive a cutting element of the mowing implement 34.

The PTO sensor 36*a* can be coupled at or near the PTO shaft 38 such that it is able to receive a mechanical motion related to rotation of the PTO shaft 38 and/or a changing magnetic field (to set forth just two nonlimiting examples) also associated with rotation of the PTO shaft 38. Examples of sensing a mechanical rotation include a counter mechanism that counts the number of rotations of the PTO shaft 38. Likewise, examples of sensing a changing magnetic field can include installation of a permanent magnet on the PTO shaft 38 and static coupling of a magnetic sensor elsewhere on the mowing implement 34 to detect cyclic variation of the permanent magnet as it rotates with the PTO shaft 38. Upon sensing the rotation, the PTO sensor 36*a* can generate the aforementioned signal related to the type of sensing the sensor 36*a* is structured to detect. In some forms, the PTO shaft sensor 36*a* can be configured to operate upon data collected from its sensing element and pass the calculated data along to another device (see further discussion below related to the data hub 40). The PTO sensor 36*a* can therefore pass along raw data, such as cyclic pulses related to a discrete rotational angle of the PTO shaft 36*a* in one form, while in another form the PTO sensor 36*a* can additionally and/or alternatively pass along a numerical counter of the number of rotations sensed from a predetermined point in time. Additionally and/or alternatively, the PTO sensor 36*a* can pass along a discrete signal having a first value (e.g., a value of 1) that indicates whether rotations of the PTO shaft 38 are being detected or a second value (e.g., a value of 0) that indicates whether rotations of the PTO shaft 38 are not detected. Such a determination can use a heartbeat monitor that outputs a value of 1 if a revolution is detected within a certain amount of time and a value of 0 if a revolution is not detected within the amount of time.

Upon sensing the rotation, the PTO sensor 36*a* can generate the aforementioned signal related to the type of sensing the sensor 36*a* is structured to detect. In some forms, the PTO shaft sensor 36*a* can be configured to calculate or otherwise process the data collected from its sensing element and pass the processed/calculated data along to another device (see further discussion below related to the data hub 40).

The mowing implement 34 depicted in the embodiment of FIG. 2 also includes a coupler configuration sensor 36*b*. Since the mowing implement 34 in the illustrated embodiment is depicted as a side mower, the coupler configuration sensor 36*b* is configured to sense which of a lateral first side or a lateral second side that the side mower is positioned when attached to the work vehicle 10. As will be appreciated, the lateral first side can be one of the let or ride side of the work vehicle 10 when attached, with the lateral second side being the other of the left or right side. The side mowers are typically displaced far enough to the left or right side such that any grass, hay, etc. over which the work vehicle 10 passes and flattens is not in the cutting path of the cutting element 46 so as to aid in cutting efficiency. The mowing implement 34 depicted in FIG. 2 is configured as a center pivot side mower that can be reconfigured to displace the side mower to either of the lateral first side or lateral second side by pivoting the mower-to-vehicle coupler 42 relative to the mowing deck 44. The coupler configuration sensor 36*b* can be coupled at or near the pivoting mechanism such that it is able to receive a mechanical motion and/or a changing magnetic field (to set forth just two nonlimiting examples) and in response generate a lateral side signal indicative of whether the mower-to-vehicle coupler 42 is configured to displace the side mower mowing deck 44 to the lateral first side or the lateral second side.

In a center pivot side mower like the type depicted in the illustrated embodiment of FIG. 2, the coupler configuration sensor 36*b* can be affixed such that the sensor 36*b* need not be reconfigured whether the mowing implement 34 is swung to the first lateral side or the second lateral side. In other types of side mowers, such as those that require removal of the mower-to-vehicle coupler 42 from the mowing deck 44 as it is reconfigured to mow from the first lateral side to the second lateral side, the coupler configuration sensor 36*b* may be affixed in such a manner that will necessitate a change in relative orientation of the coupler configuration sensor 36*b* to the mowing deck. In other words, reconfiguring the mowing implement 34 from the first lateral side to the second lateral side may require not only a reconfiguration of the mower-to-vehicle coupler 42 but also a reconfiguration of the coupler configuration sensor 36*b*. The attachment configuration of the coupler configuration sensor 36*b* can be by way of a poke yoke mechanism to ensure that the coupler configuration sensor 36*b* provides accurate indication in its signal regardless as to which side the mowing implement 34 is configured.

The coupler configuration sensor 36*b* can take a variety of specific forms. In some forms, the coupler configuration sensor 36*b* can be a switch useful to generate a signal, for example, having a Boolean characteristic (e.g., 0 indicating no operation; 1 indicating operation). In other forms, the coupler configuration sensor 36*b* can be a potentiometer capable of generating a time varying signal reflective of the angle of the pivoting relationship between the mower-to-vehicle coupler 42 and mowing deck 44. Other forms are also contemplated. The signal output from the coupler configuration sensor 36*b* can be a digital signal or an analog signal. In short, the sensor 36*a* can output a variety of data in a variety of forms to indicate the side to which the mowing deck 44 is displaced.

Upon sensing the orientation of the implement-to-vehicle coupler 42 the coupler configuration sensor 36*b* can generate the aforementioned signal related to the type of sensing the sensor 36*b* is structured to detect. In some forms, the coupler configuration sensor 36*b* can be configured to calculate or otherwise process the data collected from its sensing element and pass the processed/calculated data along to another device (see further discussion below related to the data hub 40).

The mowing implement 34 depicted in the embodiment of FIG. 2 also includes a mowing position sensor 36*c*. The mowing position sensor 36*c* is used to sense a position of the mowing deck 44 and/or cutting element 46 of the mowing deck 44, and in this regard the mowing position sensor 36*c* can also be referred to as a cutting position sensor. For example, during an operation to cut grass/hay/etc. the mowing deck 44 and/or cutting element 46 of the mowing deck 44 can be moved from a travelling position which is used to convey the mowing implement 34 to a mowing position in which grass/hay/etc. will be cut. The mowing position sensor 36*c*, therefore, can take a variety of forms which can be used to indicate position of the mowing deck 44 and/or cutting element 46 of the mowing deck 44. As such, the mowing position sensor 36*c* can operate to generate a signal, for example, having a Boolean characteristic (e.g., 0 indicating travelling position; 1 indicating cutting position) or a time varying signal reflective of the position of the mowing deck 44 and/or cutting element 46. The signal output from the mowing position sensor 36*c* can be a digital signal or an analog signal. In short, the sensor 36*c* can output a variety of data in a variety of forms reflective of position of the mowing deck 44 and/or cutting element 46.

In one form, the mowing position sensor 36*c* can be a switch useful to generate a signal, for example, having a Boolean characteristic (e.g., 0 indicating no operation; 1 indicating operation). In other forms, the mowing position sensor 36*c* can be a potentiometer capable of generating a time varying signal reflective of the position (e.g., a height) of the mowing deck 44. Other forms are also contemplated. The signal output from the mowing position sensor 36*c* can be a digital signal or an analog signal. In short, the sensor 36*a* can output a variety of data in a variety of forms to indicate the side to which the mowing deck 44 is displaced.

Upon sensing the position of the mowing deck 44 and/or cutting element 46 the mowing position sensor 36*c* can generate the aforementioned signal related to the type of sensing the sensor 36*b* is structured to detect. In some forms, the mowing position sensor 36*c* can be configured to calculate or otherwise process the data collected from its sensing element and pass the processed/calculated data along to another device (see further discussion below related to the data hub 40).

As also described above, the sensors 36 of the implement are configured to be in data communication with the data hub 40, where the data hub 40 is configured to collect signals that include content of at least one mowing data parameter indicative of an operation of the mowing implement 34 and where such collection can be archived and/or transmitted onward for further data analysis. The data hub 40 can therefore be configured to be placed in wired or wireless data communication with the sensor(s) 36. As such, signals can be communicated over either a wired (e.g., a cable) or wireless (e.g., a transceiver) interface, either of which permits data to be communicated using analog or digital techniques. In one form, the sensor(s) are coupled to the data hub 40 over a data bus, but in other forms the sensor(s) can be coupled to the data hub 40 using dedicated connections. Whether dedicated wired connections or connections through a wired data bus, such wired communications can be made through appropriate interfaces provided in the data hub 40 and sensor(s) 36. It is contemplated that physical interfaces can be hardwired such that a semi-permanent connection is made between the data hub 40 and/or sensor(s) 36 with an appropriate data cable, but in some forms the interfaces can be via an appropriate removable connector, such as, but not limited to, a USB connector.

Data hub 40 can include an energy storage device and/or can be connected with an energy storage device (e.g. see reference numeral 37 indicating an energy storage device affixed to the mowing implement 34). In some forms, the data hub 40 may include a housing which encloses internal electronic components as well as an energy storage device, such as, but not limited to, a battery. The battery can be single use or rechargeable and can use any variety of battery types including lithium ion, nickel cadmium, and alkaline, to set forth just a few non-limiting embodiments. In some forms, the data hub 40 can be connected with an external energy storage device through use of a power cable having an appropriate physical connector, such as when the energy storage device may be included in a separate housing affixed to the mowing implement 34, or alternatively through a power source made available on the work vehicle 10.

The sensor(s) 36 can also be in power communication and data communication with the data hub 40 using a variety of techniques (wired, wireless) and forms (types of physical connectors, protocols used to communicate signals, etc.). The energy storage device and type of connections/interfaces used to power the data hub 40, whether onboard the data hub 40 or via an external connection, can also be used as the power source to provide power to the sensor(s) 36. Alternatively, the sensor(s) 36 can also include their own integrated power supply. When wired connections are made between the sensor(s) 36 and data hub 40, electrical power for the sensor(s) 36 can also be provided through the same physical cable as the data signals, or alternatively can be connected through an independent physical cable. In the instance in which one or more data signals are transmitted via the sensor(s) 36 to the data hub 40 wirelessly, power can also be provided to the sensor(s) 36 either through an on-board energy storage device or through a physical cable from another energy storage device (which in some embodiments can be an integrated energy storage device in the data hub 40.

Any of the sensor(s) 36, data hub 40, and energy storage devices can be affixed to the mowing implement 34 in any suitable manner. For example, the sensor(s) 36 can be attached or supported on the mowing implement 34, integrated within one or more components of the mowing implement 34, or otherwise connected to the mowing implement 34 such that decoupling of the mowing implement 34 from the work vehicle 10 results in the sensor(s) 36, data hub 40, and energy storage devices travelling with the mowing implement 34 at the exclusion of the work vehicle 10.

It is also contemplated that the data hub 40 may be configured to be in wired or wireless data communication with a device in the work vehicle 10 to pass along data, either raw or processed, as a result of the data hub 40 being in data communication with the sensor(s) 36. The data communicated from the data hub 40 to the device in the work vehicle can generally be referred to as usage data since it relates to usage of the mowing implement 34. Usage data communicated from the data hub 40 is data that is associated with signals from the sensor(s) 36, and as a consequence, includes information based on signals from the sensor(s) 36. For example, the information communicated from the data hub 40 can be the signals as received from the sensor(s) 36 and/or can be information that is processed or otherwise calculated or derived from the signals as received from the sensor(s) 36. Examples of processed data include any appropriate filtering (e.g., low pass filtering) or data that has been calibrated using a calibration curve hosted local to the data hub 40. Other examples are also contemplated.

The device in the work vehicle 10 which is in communication with the data hub 40 can be a handheld device, such as device 48 mentioned above having some type of position device(s) 32. It is also contemplated that the data hub 40 can be the same as the device 48. Thus, the mowing implement 34 can include, in the broadest sense, a data hub 40 in communication with the sensors 36 where the data hub 40 is either located physically on the mowing implement 34 or is located off of the implement 34, such as, but not limited to, if the data hub 40/device 48 is a handheld device located in the cab of the work vehicle 10. In these embodiments is it envisioned that the sensors 36 can be in wired or wireless communication with the data hub 40/device 48.

Any type of wired or wireless data communication protocol can be used in any embodiment between the data hub 40 and the device 48 aboard the work vehicle 10 mentioned above. For example, the data hub 40 can be in wired communication with the device 48 on board the work vehicle 10 using an ethernet protocol and having an appropriate physical connector. In another nonlimiting example, the data hub 40 can be in wireless communication with an external computing device through any suitable communication protocol, such as, but not limited to. Bluetooth communication, WiFi communication, etc.

When the device 48 is in the form of a handheld device, the handheld device 48 can be any device suitable for being supported by a person (e.g., an operator of the work vehicle 10), such as a device sized to be held in the person's hand. The handheld device 48 can include a display (e.g., an LED display) and a manner of interacting with the device 48, such as a touch screen and/or keypad. Any variety of displays and input devices are contemplated herein. The size and weight of such devices 48 can vary but will in many cases take the size of a handheld scanner, mobile phone, or tablet computer, among potential others. By means of nonlimiting example, handheld device could refer to a completely new product developed specifically for use with the mowing implement 34 or it could refer to an existing device, such as a smart phone or tablet. Furthermore, the different embodiments discussed herein could be completely integrated into one device or be contained in multiple devices that have the ability to share information.

Whatever the form, whether it be handheld or not, when the device 48 is in communication with the data hub 40 it is likewise capable of archiving and/or passing through to another computing device data associated with the sensor(s) 36. Since the device 48 in some embodiments includes an onboard position device 32 or is otherwise capable of communicating with a position device 32, the computing device can associate a data stream from the sensor(s) 36 with a position determined through use of the position device 32. The association of position from position device 32 with data from the sensor(s) 36 can be such that a position history of data is compiled. For example, any given sampling of data from the sensor(s) 36 at a given moment in time can be associated with a position from the position device 32 at the same moment in time. When another sample is taken from sensor(s) 36, another sample of position data from position device 32 can also be taken. In this manner is it possible to inspect a dataset of sensor data and position data and create a map that illustrates the coverage of the work implement 34.

Other data beyond position information can be associated with the data stream from the sensor(s) 36 to create a dataset history. For example, date and/or time of day can be included in the dataset history to create a time history which permits evaluation of when and how long a mowing operation was undertaken. Additionally and/or alternatively, information such as current or recent weather conditions can also be paired with data in the dataset, either as metadata for the entire dataset or as separate variables in the dataset. Whatever the type of data, be it date and/or time of day and/or weather, such information can be determined by the device 48 through any appropriate on board sensor and/or communication request from other sources. For example, in the case of the device 48 taking the form of a smart phone, the device 48 may include onboard data indicative of current date/time (such as through, for example, a GNSS signal). If current weather is not already available onboard, the device 48 can request such information when in cellular communication with a network (e.g., through an API call to a known source of weather-related information).

Adjustments can be made to the dataset of sensor data and position data (whether or not it includes date and/or time of day and/or weather, etc.) to account for sampling rates of different sensors, position updates, coarseness of data, etc. For example, if position data is made available at one second intervals, but the data from one or more sensors 36 is sampled at a higher rate, either the data from the sensors 36 can be intentionally sampled at the same rate and time as the data from the position device 32, or the data from the position device 32 can be used at the sampling rate of the sensor 36 albeit with repeated data values given the difference in sampling intervals. Other techniques are also contemplated.

Further to the above, it is also possible to adjust the position data from the position device 32 to account for the offset from the location of the position device 32 to the mowing implement 34. If, for example, it is known that the mowing implement 34 is located 30 feet to the rear and offset 10 feet laterally, adjustments can be made to the data from the position device 32 to better reflect the actual position of the mowing deck 44. Such adjustments in this regard may use a direction of travel and/or assumptions on kinematics of the relative placement of the position device 32 (e.g., such as device 32 integrated into the device 48) to the mowing deck 44.

In lieu of data from the position device 32 being associated with data from sensors 36 in the device 48 as in the embodiment immediately above, in another embodiment, data from position device 32 can be associated with data from sensors 36 in the data hub 40. The association of position from position device 32 with data from the sensor(s) 36 can be such that a time series, or time history, of data is compiled. For example, any given sampling of data from the sensor(s) 36 at a given moment in time can be associated with a position from the position device 32 at the same moment in time. When another sample is taken from sensor(s) 36, another sample of position data from position device 32 can also be taken. In this manner is it possible to inspect a time series dataset of sensor data and position data and create a map that illustrates the coverage of the work implement 34.

As in the embodiment above, adjustments can be made to the associated time series in the data hub 40 to account for sampling rates of different sensors, position updates, coarseness of data, etc. For example, if position data is made available at one second intervals, but the data from one or more sensors 36 is sampled at a higher rate, either the data from the sensors 36 can be intentionally sampled at the same time as the data from the position device 32, or the data from the position device 32 can be used at the sampling rate of the sensor 36 albeit with repeated data values given the difference in sampling intervals. Other techniques are also contemplated.

Figure 3:
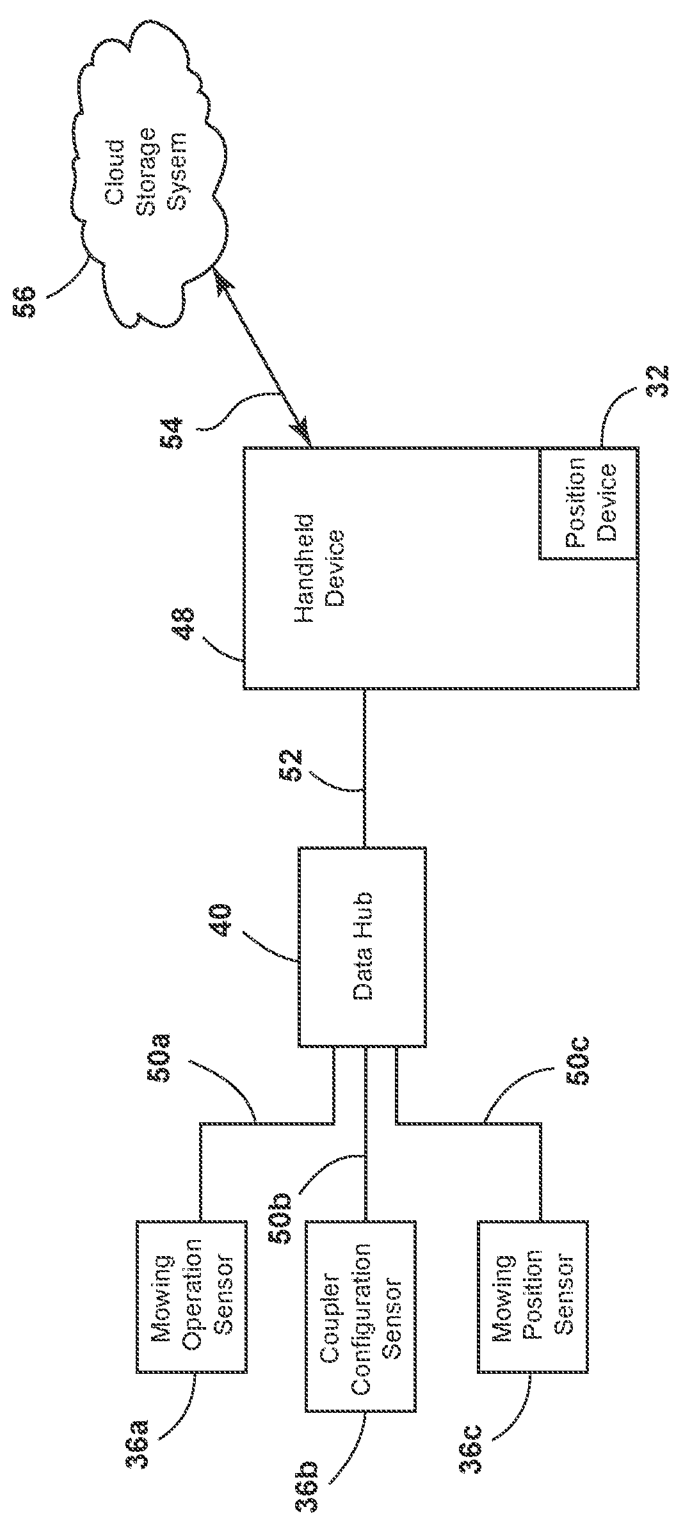
FIG. 3 illustrates a view of a plurality of sensors, a data hub, a device, and a cloud computing environment in accordance with aspects of the present application.

Turning now to FIG. 3, one embodiment is depicted of data communication between respective operating devices of the mowing system described herein. Sensors 36 collect data and communicate signals 50 that include content related to one or more parameters of a mowing operation to the data hub 40. The data hub 40 collects the data sent by the sensors 36 and can either archive the signals and/or can transmit the signals onward via a combined signal 52 to the device 48. The combined signal 52 can take on a variety of forms, including a time division multiplexed signal representing data content related to each of the signals 50 derived from respective sensors 36. The device 48 can associate content from the combined data signal 52 derived from the signals from each of the sensors 36 with a current time and a current position. The current position, and in some forms the current time, can be recorded from data made available from the position device 32. Once the device 48 has associated the content related to the one or more parameters of the various sensors 36 with that of a time and position to create an integrated dataset, the device 48 can communicate that integrated dataset onward as depicted by reference numeral 54 to a cloud storage system 56 or the like. Communication with cloud storage system 56 can be via cellular communication, to set forth just one nonlimiting embodiment. Other types of storage systems can be used in lieu of a cloud storage system, including personal storage devices, for example. It will be appreciated that each of signals 50, 52, and 54 can be transmitted in real time, can be transmitted on demand by an operator or by any of the associated systems 36, 40, 48, and 56. It will also be appreciated that any of the systems 36, 40, 48, and 56 can archive data to be sent at a later time.

During operation, an operator or other user of device 48 is capable of initiating the system to begin capturing data via sensors 36 and 'record' data during operation. The initiation and recording of data can be via a display made available in the device 48. In some embodiments, the operator is also capable of interacting with sensors 36 and/or data hub 40 to bring those systems online. For example, in some embodiments, the sensors 36 are hardwired to receive electrical power from the data hub 40 and powering up the data hub 40 also initiates a powerup of the sensors 36. Once an operator has powered up the data hub 40, wireless communication can be established in those embodiments having wireless data communication between data hub 40 and device 48. After the data hub 40 is placed into data communication with the device 48, operations can commence where data can be automatically sensed by the sensors, collected and transmitted to the data hub 40, and archived and/or transmitted to the device 48.

In an additional embodiment, the work vehicle 10 may also include a front mower arranged to mow in front of the work vehicle 10 as it travels through a field during a mowing operation. The front mower can, but need not, include any sensors 36 or data hub 40. In one form, no additional sensors 36 or data hub 40 are included. The handheld device 48 can include a display screen or touchscreen, as mentioned above, that permits an operator to input that a front mower is being used. Additionally, in some forms, the handheld device 48 may also require input from the operator on a mower width associated with the front mower. Inputs from the operator into the handheld device 48, such as the presence of a front mower and width of the mower, can be recorded along with data received from sensors 36 and data hub 40.

Figure 4:
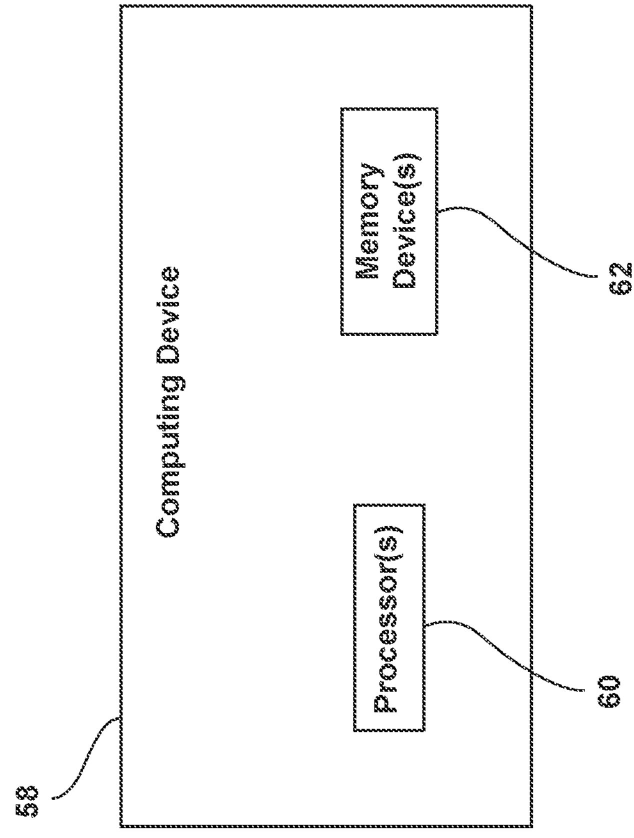
FIG. 4 illustrates a view of a computing device which can be used in several devices/systems, such as for the sensors, data hub, device, and cloud computing environment, in accordance with aspects of the present subject matter.

FIG. 4 depicts a computing device useful to carry out the activities and functions for devices/systems herein, such as the sensors 36, data hub 40, device 48, and storage 56. In general, such a computing device suitable for use herein may comprise any suitable processor-based device known in the art. Furthermore, the activities or functions of any given device/system, such as the sensors 36, data hub 40, device 48, and storage 56 can be accomplished by one or more computing devices. A computing device 58 is depicted in FIG. 4 and may include one or more processor(s) 60 and associated memory device(s) 62 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 of the computing device 58 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the computing device 52 to perform various computer-implemented functions, such as one or more aspects of the method 64 described below with reference to FIG. 5. In addition, the computing device 58 may also include various other suitable components, such as a communications circuit or module, one or more input/output channels, a data/control bus and/or the like.

It should be appreciated that the computing device 58 of any of the suitable devices/systems (e.g., sensors 36, data hub 40, device 48, storage 56) may correspond to an existing computing device of the work vehicle 10 and/or implement 34, or the computing device 52 may correspond to a separate processing device. For instance, in one embodiment, any of the devices/systems described herein that can take the form of a computing device may form all or part of a separate plug-in module that may be installed within the work vehicle 10 and/or implement 34 to allow for the disclosed system and method to be implemented without requiring additional software to be uploaded onto existing devices of the work vehicle 10 and/or implement 34.

Furthermore, in one embodiment, the device 48 may also include a user interface useful to execute any action and/or function listed above. The user interface may include one or more feedback devices (not shown), such as display screens, speakers, warning lights, and/or the like, which are configured to communicate useful information to the user of the device 48. In some embodiments, the displays and feedback described above can also be made available in any of the sensors 36 and data hub 40. In addition, some embodiments of the user interface may include one or more input devices, such as touchscreens, keypads, touchpads, knobs, buttons, sliders, switches, mice, microphones, and/or the like, which are configured to receive user inputs from the operator. In one embodiment, the user interface may be positioned within the cab of the work vehicle 10. However, in alternative embodiments, the user interface may have any suitable configuration and/or be positioned in any other suitable location.

Figure 5:
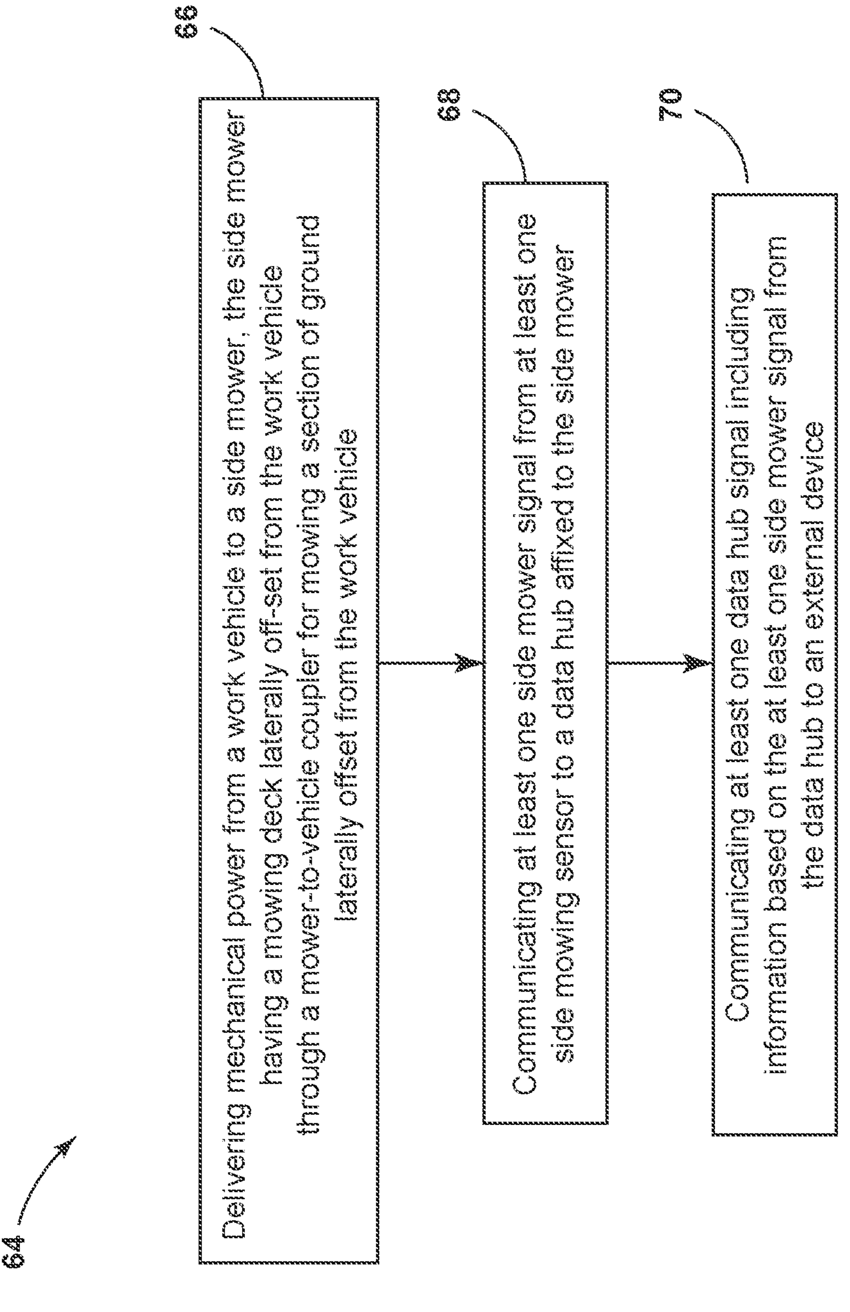
FIG. 5 illustrates a flow diagram of one embodiment of a method for operating a side mower in accordance with aspects of the present subject matter.

Referring now to FIG. 5, a flow diagram of one embodiment of a method 64 for operating a mowing implement is illustrated in accordance with aspects of the present subject matter. The mowing implement is configured to be towed behind a work vehicle and can include sensors for generating information regarding a mowing operation. In general, the method 64 will be described herein with reference to the side mower depicted in FIG. 2. However, it should be appreciated by those of ordinary skill in the art that the disclosed method 64 may generally be implemented with any mowing implement having any suitable implement configuration as discussed above. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at 66, the method 64 may include delivering mechanical power from a work vehicle 10 to a side mower 34, the side mower 34 having a mowing deck 44 laterally offset from the work vehicle 10 through a mower-to-vehicle coupler 42 for mowing a section of ground laterally offset from the work vehicle 10. At step 68, the method 64 may also provide communicating at least one side mower signal from at least one side mowing sensor 36 to a data hub 40 affixed to the side mower 34. At step 70, the method can further include communicating at least one data hub signal 52 including information based on the at least one side mower signal 50 from the data hub 40 to an external device 48. It is to be understood that the steps of the method 64 can be performed by a computing system upon loading and executing software code or instructions which are tangibly stored on a tangible computer readable medium, such as on a magnetic medium, e.g., a computer hard drive, an optical medium, e.g., an optical disc, a solid-state memory, e.g., flash memory, or other storage media known in the art. Thus, any of the functionality performed by any computing system described herein, such as the method 64, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the method 64 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A side mowing system comprising:

a side mower structured for towing by a work vehicle and configured to mow a section of ground laterally offset from the work vehicle as the work vehicle traverses the ground, the side mower having:

a mowing deck having a mowing mechanism coupled to the mowing deck, the mowing mechanism having a moveable mowing blade structured to move relative to the mowing deck for cutting vegetation;

a mower-to-vehicle coupler configured for coupling the side mower to the work vehicle and structured to carry a towing load imparted to the side mower as a result of being towed behind the work vehicle;

at least one side mowing sensor configured to generate at least one side mower signal related to at least one side mower parameter;

an energy storage device affixed to the side mower; and a data hub affixed to the side mower and being configured as a computing device including one or more processors and associated memory, wherein the data hub is in data communication with the at least one side mowing sensor, the data hub structured to transmit usage data associated with the at least one side mower parameter, wherein the data hub is in electrical communication with the energy storage device, and wherein the data hub is directly connected to the at least one side mowing sensor via a wired power interface such that electrical power is transmitted directly from the data hub to the at least one side mowing sensor.

2. The side mowing system of claim 1, wherein the at least one side mowing sensor includes a mowing operation sensor configured to generate a mowing signal indicative of operation of the mowing mechanism when the mowing mechanism is engaged.

3. The side mowing system of claim 2, wherein the data hub is in data communication with the mowing operation sensor, the usage data transmitted by the data hub including information based on the mowing signal.

4. The side mowing system of claim 1, wherein the mower-to-vehicle coupler is configurable to displace the side mower mowing deck to either of a lateral first side or a lateral second side of the work vehicle for a mowing operation;

wherein the at least one side mowing sensor includes a coupler configuration sensor coupled to the side mower and configured to generate a lateral side signal indicative of whether the mower-to-vehicle coupler is configured to displace the side mower mowing deck to the lateral first side or the lateral second side;

wherein the at least one side mowing sensor also includes a cutting position sensor coupled to the side mower and configured to generate a cutting position signal of the side mower mowing deck; and wherein the data hub is in data communication with the coupler configuration sensor and the cutting position sensor.

5. The side mowing system of claim 4, wherein the data hub is structured to archive the lateral side signal and the cutting position signal.

6. The side mowing system of claim 4, wherein the coupler configuration sensor is a switch.

7. The side mowing system of claim 1, wherein the data hub includes a wired data communication interface, and wherein the data hub is in wired data communication with the at least one side mowing sensor via the wired data communication interface.

8. The side mowing system of claim 7, wherein the wired data communication interface and the wired power interface are independent connections.

9. The side mowing system of claim 1, wherein the data hub also includes a wireless transceiver used to transmit data, and wherein the data hub is in wireless data communication with the at least one side mowing sensor via the wireless transceiver.

10. The side mowing system of claim 1, wherein the energy storage device is an integrated energy storage device in the data hub.

11. The side mowing system of claim 1, wherein the energy storage device is an external energy storage device, and wherein the data hub is in electrical communication with the external energy storage device via a power cable.

12. A method of operating a side mower system, the method comprising:

delivering mechanical power from a work vehicle to a side mower, the side mower having a mowing deck laterally offset from the work vehicle through a mower-to-vehicle coupler for mowing a section of ground laterally offset from the work vehicle;

powering a data hub affixed to the side mower using electrical power from an energy storage device affixed to the side mower, the data hub being directly connected to at least one side mowing sensor via a wired power interface such that electrical power is transmitted directly from the data hub to the at least one side mowing sensor;

communicating at least one side mower signal from the at least one side mowing sensor to the data hub, the data hub being configured as a computing device including one or more processors and associated memory; and communicating at least one data hub signal including information based on the at least one side mower signal from the data hub to an external device.

13. The method of operating a side mower system of claim 12, wherein the at least one side mowing sensor includes a coupler configuration sensor and a cutting position sensor, wherein the at least one side mower signal includes a lateral side signal from the coupler configuration sensor and a cutting position signal from the cutting position sensor, the method further comprising:

communicating the lateral side signal from the coupler configuration sensor to the data hub; and communicating the cutting position signal from the cutting position sensor to the data hub.

14. The method of operating a side mower system of claim 13, wherein the at least one side mowing sensor includes a mowing operation sensor, wherein the at least one side mower signal includes a mowing signal from the mowing operation sensor, the method further comprising sensing operation of the side mower using the mowing operation sensor configured to detect delivery of mechanical power to a moveable mowing blade of a mowing mechanism affixed to the side mower.

15. The method of operating a side mower system of claim 14, further comprising archiving the lateral side signal, the cutting position signal, and the mowing signal in the data hub.

16. The method of operating a side mower system of claim 14, further comprising wirelessly transmitting a processed data based on at least one of the lateral side signal, the cutting position signal, and the mowing signal from the data hub to an external device.

17. The method of operating a side mower system of claim 12, further comprising pairing the at least one side mower signal with a geographic position signal after information based on the at least one side mower signal has been transmitted from the data hub.

18. The method of operating a side mower system of claim 12, wherein the method further comprises establishing a wireless communication between the data hub and the at least one side mowing sensor using a wireless transceiver; and wherein communicating the at least one side mower signal comprises wirelessly communicating the at least one side mower signal from the at least one side mowing sensor to at the data hub.

19. A towed mower, comprising:

a mowing deck having a moveable mowing blade supported by the mowing deck and structured to cut vegetation;

a mower-to-vehicle coupler used to couple the mowing deck to a work vehicle and structured to carry a towing load imparted to the mowing deck as a result of being towed behind the work vehicle;

an implement sensor structured to generate a mowing signal related to at least one mowing parameter;

an energy storage device affixed on the towed mower; and a data hub affixed on the towed mower and in data communication with the implement sensor, the data hub structured to collect the mowing signal to create an operating data history of the towed mower;

wherein the data hub is configured as a computing device including one or more processors and associated memory, wherein the data hub is in electrical communication with the energy storage device, and wherein the data hub is directly connected to the implement sensor via a wired power interface such that electrical power is transmitted directly from the data hub to the implement sensor.

* * * * *